April 5, 1932.  R. E. PETERSON  1,852,538

DAMPING MEANS FOR GEAR WHEELS

Filed Oct. 11, 1929

INVENTOR
Rudolph E. Peterson.
BY
Wesley L. Carr
ATTORNEY

Patented Apr. 5, 1932

1,852,538

UNITED STATES PATENT OFFICE

RUDOLPH E. PETERSON, OF WILKINSBURG, PENNSYLVANIA, ASSIGNOR TO WESTINGHOUSE ELECTRIC & MANUFACTURING COMPANY, A CORPORATION OF PENNSYLVANIA

DAMPING MEANS FOR GEAR WHEELS

Application filed October 11, 1929. Serial No. 398,988.

My invention relates, in general, to silencing devices and, in particular, to means for preventing ringing of wheels, such as gear wheels.

In the prior art, it has been attempted to produce silent gear wheels by attaching non-sonorous material to the webs of the wheels or by making the gear rim separately and insulating it from the web by means of a cushion of non-metallic material.

The devices of the prior art have been found to be unsatisfactory for a number of reasons, among which may be mentioned the fact that they are expensive to construct, are likely to be destroyed by vibration when subjected to severe service and, in the case of the last mentioned expedient, it has been found difficult to construct the gear in such manner that the rim is accurately concentric with the hub.

An object of the invention is, generally stated, to provide simple and inexpensive means for preventing ringing of gear wheels.

Another object of the invention is to provide a damping device, for absorbing the vibrations of a wheel rim, that shall be of rugged construction and not liable to be damaged when the wheel to which it is applied is utilized on machinery which is subjected to violent vibrations.

A further object of the invention is to provide a sound-deadening device for gear wheels that may be readily applied during the process of manufacturing a wheel without requiring expensive machine work either on the wheel or on the sound-deadening device.

Figure 1:
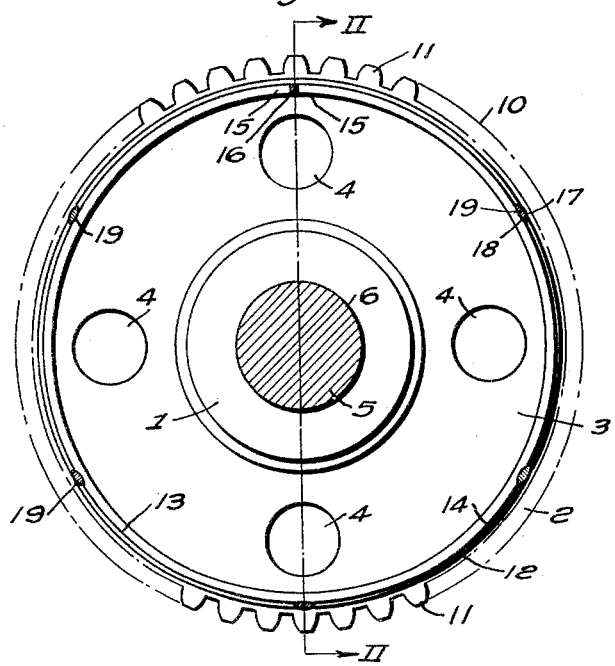
Figure 2:
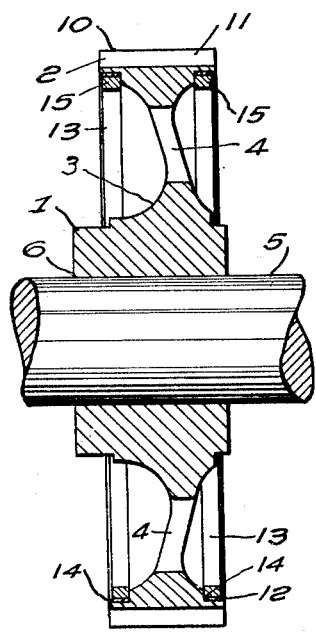
Figure 3:
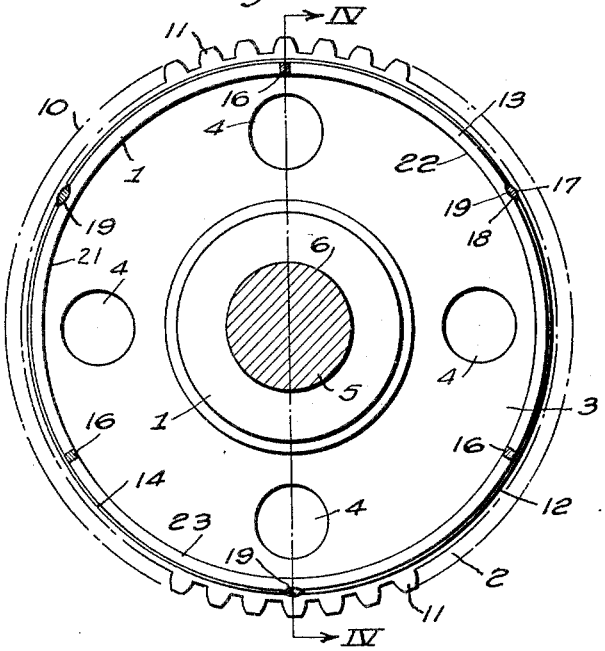
Figure 4:
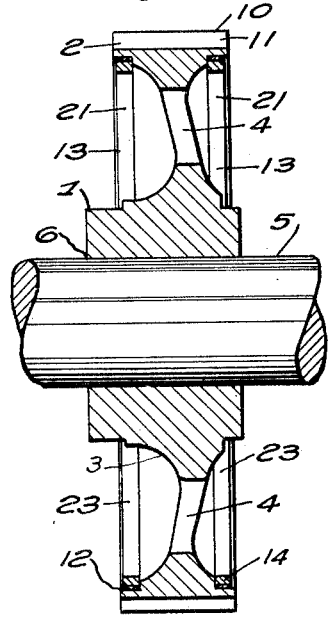

To accomplish the foregoing, as well as other objects of the invention, that will be apparent upon reading the following specification, the silencing means which embody my invention may be applied to a wheel as shown in the accompanying drawings, in which:

Figure 1 is a view, in elevation, of a standard gear wheel provided with silencing rings, Fig. 2 is a view, in longitudinal section, of the gear wheel, taken along the line II—II of Fig. 1, Fig. 3 is a view, in elevation similar to Fig. 1, of a gear wheel provided with a modified form of silencing rings, and Fig. 4 is a view, in longitudinal section, of the gear wheel shown in Fig. 3, taken along the line IV—IV.

A wheel, such as the standard gear wheel shown in the drawings, comprises in general, a central portion or hub 1 that is disposed to support a concentric rim 2 by means of an interconnecting structure, such as a web 3. In the particular structure illustrated, the web 3 is formed integrally with the hub 1 and the rim 2 and is provided with longitudinally disposed openings 4 in uniform spaced relation, from which excess metal has been removed for the purpose of reducing the weight of the wheel. Ordinary gear wheels of this nature, which are applicable for use in locomotive and street-car-drive mechanisms, are formed from a single piece of steel by a forging operation.

In order that the gear wheel may be mounted upon a shaft 5, such as a railway vehicle axle, the hub 1 is provided with a centrally disposed bore or opening 6 of suitable diameter. For the purpose of rigidly securing the gear wheel to the shaft 5, the inner diameter of the opening 6 is made slightly smaller than the outer diameter of the shaft 5 to constitute a press fit and the wheel may be pressed upon the shaft in any well known manner. As shown, the outer periphery 10 of the gear rim 3 is provided with gear teeth 11 of any suitable form for cooperating with mating teeth of a driving pinion (not shown).

In my co-pending application, Serial No. 306,816, filed September 19, 1928, and assigned to the Westinghouse Electric and Manufacturing Company, it has been explained that gear wheels emit ringing sounds, particularly when operating at loads of such light nature that the cooperating gear teeth may be permitted to move relative to each other through the space provided by the normal backlash in the gearing. Under such conditions, the teeth of one gear-wheel may strike the teeth of the cooperating gear-wheel with considerable force. By reason of the hammer-like blows which are applied to the teeth of the gear-wheel by the cooperating teeth of a driving pinion, when operating under light-load conditions, the gear rim may be caused to vibrate in substantially a radial direction at its natural frequency, which is usually within the audible range of sound frequency.

In accordance with the present invention, these objectionable vibrations may be suppressed, or damped, by applying non-sonorous material 12 to the rim, preferably on its inner surface. The material utilized for this purpose is of such nature that it will absorb and dissipate the energy of vibration of the gear rim 2 and thus prevent the energy from being radiated as sound. In practice, a fibrous non-metallic material, such as packing material which is known to the trade as Siegelite, has been found to be preferable, although any other material which may be readily made to conform to the shape of the gear rim and which possesses a high degree of internal friction, may be utilized. It has been found that, in order to most effectively prevent the radiation of sound by a wheel, the damping material 12 should be applied to the inner surface of the gear rim 2 in a continuous strip, having the form of an annulus or ring, which is disposed concentric with the gear rim 2 and adjacent its edge or face. As shown in the drawings, it is preferable that two similar rings 12 of non-sonorous material be utilized, one adjacent to each face of the wheel.

In order that the fibrous rings 12 may be held in close engagement with the inner surface of the rim 2, a pair of retaining rings 13 of wrought-iron or other suitable material are provided. As shown in Figs. 1 and 2, each of the retaining rings 13 may be in the form of a bar of suitable dimensions which has been rolled into a ring having an outside diameter somewhat less than the diameter of the inner surface 14 of the rim 2.

In assembling the damping device, it is simply necessary to apply the strip 12 of non-sonorous material to the inner surface 14 of the rim 2, then place the ring 13 in its proper position within rim 2 and expand it to force the material 12 into close contact with the inner surface 14 of the rim 2 by inserting a wedge or other suitable tool between the ends 15 which define the bar from which the ring was formed. A small amount of metal 16 may be deposited between the ends 15 of the retaining ring 13 by means of a welding process to tack or hold the ring in place. The wedging tool may then be withdrawn and the entire opening between the ends 15 be filled by means of deposited metal 16. In order to securely fasten the ring 13 in place, it is preferable that a plurality of corresponding notches 17 and 18 be cut in the inner edge of the rim 2 and in the outer edge of the ring 13, respectively, for instance, by applying the corner of a grinding wheel, and that the recesses thus provided be filled with deposited metal 19.

As shown in Figs. 3 and 4, in accordance with the modified form of the invention, the retaining ring 13 may be assembled from a plurality of segmental portions 21, 22, and 23. In assembling this structure, the segments are placed in their approximate positions and expanded into their operating positions by inserting wedges between their adjacent ends. After the wedges have been inserted, the segments 21, 22, and 23 may be securely fastened to the gear rim 2 by depositing metal 16 between the ends by a welding process and by welding each segment at its mid portion to the rim 2 by filling the cooperating notches 17 and 18 with a welding deposit 19.

By either of these methods of applying damping rings to the inner surface of a gear rim, proper contact may be established between the non-sonorous material and the inner surface of the gear rim without the necessity of carefully machining either the surface 14 or the periphery of the retaining rings 13, inasmuch as the rings 13 will deflect to conform to the circle defined by the surface 14 and the fibrous damping material 12, when subjected to pressure.

From the foregoing description of my sound-damping means and the explanation of its construction, it will be apparent that the invention introduces a rugged, convenient and effective means for preventing the ringing of gear wheels.

Although I have described specific embodiments of my invention, those skilled in the art will be enabled to provide silencing means for wheels which may embody various other materials and other modes of construction without departing from the spirit and scope of the invention, as defined in the appended claims.

I claim as my invention:

1. A gear wheel comprising, in combination, hub, web and rim portions, the rim portion extending laterally relative to the web portion presenting an inner-face, non-sonorous material applied to the inner-face of the rim portion and a ring mounted inside the rim portion pressing the non-sonorous material against the inner-face of the rim portion, said ring being independent of the gear members and cooperating only with the non-sonorous material for the purpose of deadening sound.

2. A gear wheel comprising in combination, a hub, web and rim portions, the rim portion extending laterally relative to the web portion presenting an inner-face, non-sonorous material applied to the outer edge of the inner-face of the rim portion and a ring mounted inside the rim portion pressing the non-sonorous material against the outer edge of the inner-face of the rim portion, said ring being independent of the gear members and disposed to cooperate with the non-sonorous material for the purpose of absorbing vibrations of the rim member to deaden sounds.

3. In a gear wheel having an overhanging flange, in combination, a hub, means for securing the hub to the flange and sound-deadening means comprising a ring, of material other than that of which the flange is constituted, disposed to engage the inner surface of the flange and spaced from other portions of the gear wheel.

4. A gear wheel comprising a steel member constituting integrally formed hub, web, and overhanging rim portions, a wrought-iron ring disposed on the inner surface of said rim adjacent the outer edges thereof, and a ring of non-metallic material disposed between the wrought-iron ring and the rim portion for deadening the rim to prevent ringing while in operation.

In testimony whereof, I have hereunto subscribed my name this first day of October, 1929.

RUDOLPH E. PETERSON.